US012642193B2

(12) United States Patent
Kokanovic et al.

(10) Patent No.: US 12,642,193 B2
(45) Date of Patent: Jun. 2, 2026

(54) SYSTEM WITH ROTATIONAL GUIDE RAILS FOR PROTECTION OF AN ORCHARD AGAINST WEATHER CONDITIONS

(71) Applicants: Momcilo Kokanovic, Obrenovac (RS); Marko Kokanovic, Obrenovac (RS); Miodrag Kokanovic, Obrenovac (RS); Filip Kokanovic, Obrenovac (RS)

(72) Inventors: Momcilo Kokanovic, Obrenovac (RS); Marko Kokanovic, Obrenovac (RS); Miodrag Kokanovic, Obrenovac (RS); Filip Kokanovic, Obrenovac (RS)

( * ) Notice: Subject to any disclaimer, the term of this patent is extended or adjusted under 35 U.S.C. 154(b) by 151 days.

(21) Appl. No.: 18/562,359

(22) PCT Filed: May 20, 2022

(86) PCT No.: PCT/RS2022/000008
§ 371 (c)(1),
(2) Date: Nov. 20, 2023

(87) PCT Pub. No.: WO2022/245232
PCT Pub. Date: Nov. 24, 2022

(65) Prior Publication Data
US 2024/0260516 A1     Aug. 8, 2024

(30) Foreign Application Priority Data
May 21, 2021    (RS) ................................. P-2021/0633

(51) Int. Cl.
*A01G 13/21*        (2025.01)
*A01G 13/06*        (2006.01)
*A01G 13/24*        (2025.01)
(52) U.S. Cl.
CPC ............. *A01G 13/21* (2025.01); *A01G 13/06* (2013.01); *A01G 13/24* (2025.01)

(58) Field of Classification Search
CPC ........ A01G 13/06; A01G 13/21; A01G 13/24; Y10S 135/903; E04F 10/02
(Continued)

(56) References Cited

U.S. PATENT DOCUMENTS

| | | | |
|---|---|---|---|
| 1,106,624 A | * | 8/1914 | Cadwallader et al. ...................... A01G 13/21 160/264 |
| 2,889,664 A | * | 6/1959 | Olshansky ............... B21D 7/06 47/29.1 |
| 4,296,568 A | | 10/1981 | Dukes |

FOREIGN PATENT DOCUMENTS

| | | |
|---|---|---|
| CN | 102271494 | 12/2011 |
| CN | 107018828 | 8/2017 |

(Continued)

*Primary Examiner* — Robert Canfield
(74) *Attorney, Agent, or Firm* — Patshegen IP; Moshe Pinchas

(57) ABSTRACT
A system with rotational guide rails for the protection of an orchard from weather conditions, consisting of a row of columns (1,2), so that at the top of each column (1,2) a pivoting arm (6,7) is rotationally connected by its middle. Over the pivoting arms (6,7), a rectangular cover is placed (10) in the form of a net or a foil, and through its middle section, the cover has a sliding connection to the middle cable (9) run through the columns (1,2), whereas the longer edges have a sliding connection to end cables (8). At the ends of pivoting arms (6,7), rotational guide rails (11) are placed, consisting of a stud screw (13) so that the upper end of the screw (13) is firmly tied to the cable (8), and the lower end of the screw (13) is rotationally connected to the end of a pivoting arm (6,7). The connection between the upper end of the screw (13) and the cable (8) is placed in a cylindrical casing (12) or a cap (12.*a*) which prevents it from coming into contact with the cover (10). Through this construction, during the rotation of pivoting arms (6,7**) to one side, the
(Continued)

cover (10) contracts into a parallelogram unobstructed, and when rotating the arms to the other side, the cover (10) stretches into a rectangular shape unobstructed.

9 Claims, 5 Drawing Sheets

(58) Field of Classification Search
USPC .......................................... 47/22.1, 24.1, 31
See application file for complete search history.

(56) References Cited

FOREIGN PATENT DOCUMENTS

| | | | | | |
|---|---|---|---|---|---|
| CN | 208675950 | | 4/2019 | | |
| CN | 112640713 | | 4/2021 | | |
| DE | 10349243 | B4 * | 5/2014 | ............. | A01G 13/21 |
| DE | 202016103168 | U1 * | 7/2016 | ............. | A01G 13/21 |
| EP | 2783566 | A1 * | 10/2014 | ............. | A01G 13/21 |
| EP | 3138390 | | 3/2017 | | |
| EP | 4340594 | B1 * | 7/2025 | ............. | A01G 13/21 |
| IT | 102019000005456 | | 10/2020 | | |
| KR | 2000-0075288 | | 12/2000 | | |
| KR | 20110057862 | A * | 6/2011 | ............. | A01G 13/21 |
| KR | 101287379 | B1 * | 7/2013 | ............. | A01G 13/10 |
| KR | 20130004587 | U * | 7/2013 | ............. | F16B 7/0406 |
| KR | 101769449 | B1 * | 8/2017 | ............. | A01G 9/126 |
| SU | 1754013 | A1 * | 8/1992 | | |
| WO | WO 95/25424 | | 9/1995 | | |
| WO | WO 2019/020858 | | 1/2019 | | |

* cited by examiner

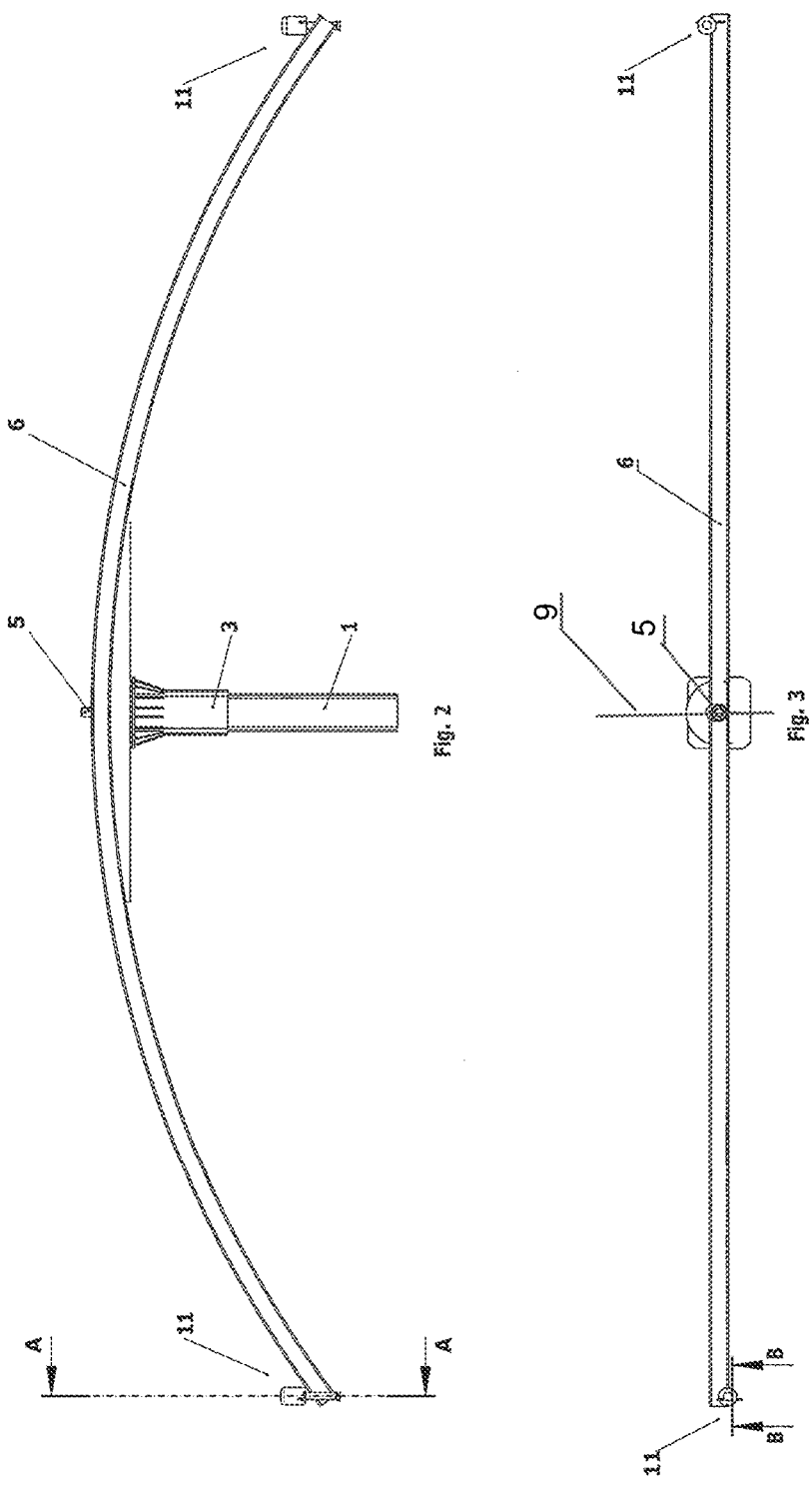

SYSTEM WITH ROTATIONAL GUIDE RAILS FOR PROTECTION OF AN ORCHARD AGAINST WEATHER CONDITIONS

TECHNICAL FIELD

The present invention is broadly related to fruit cultivation, and more specifically to plant protection, i.e. protective covers for plants and the devices for installing them, i.e. the devices for protecting plants from weather conditions, animals, birds, or other pests.

Technical Problem

The technical problem solved by the present invention relates to securing simple, quick stretching and stacking of the rotational system's cover for protecting an orchard from weather conditions, and insects and birds, with a complete, safe stretching without any damage; and its stabilization in an open position, i.e. proper and complete stacking without any stacking resistance and damage, which is also affordable, reliable, and easy to manufacture, install and maintain, while providing sufficient load capacity, particularly if the cover is exposed to additional loads due to heavier hail or stronger wind.

BACKGROUND TECHNOLOGY

Background technology lists multiple systems for protecting orchards from weather conditions via pivoting arms. Namely, the systems for orchard protection via pivoting arms are used for stretching the cover above the orchard and protecting it against weather conditions; depending on needs, they can be closed for increased sun exposure, and decreased or eliminated shadows over the orchard.

For example, the USSR document No. SU 1754013A1 lists a device for vineyard protection from hail, which consists of two end columns; the columns' tops are rotationally connected to pivoting arms, to which the whole length of the protective cover is connected via shorter sides. The cover is rectangular when stretched, and freely supported down the longitudinal axis by middle columns placed in sequence between the end columns. Though such a system enables the contraction of a rectangular cover into a parallelogram, and vice versa, it does not provide side support to the cover during the contraction or stretching. The deficiency of this solution lies in the fact that the cover, whether stretched or contracted, is supported only by middle columns, and there is no side support whatsoever.

Additionally, the international patent application No. WO95/25424 lists a solution for an orchard protection device, described as a protective cover for protecting orchards from hail, birds, and sun, consisting of end columns, the tops of which are rotationally connected to pivoting arms; a rectangular cover, stretched, is connected to the arms by shorter sides and throughout its whole length. As with the previously described technical solution from background technology, the protective cover, made of fabric, contracts by changing its rectangular shape into a parallelogram, and via rotation of end pivoting arms. In addition to that, the solution stipulates extra stiffening of the cover thanks to middle columns, connected by a central cable, run through the cover down the longitudinal axis, and via side cables firmly fixed with clips to the longer sides of the cover. The cables can be tightened via a winch, which is also used for the rotation of end pivoting arms, or via a system of anchors, weights, levers, and additional cross-sectional and longitudinal cables, which enable proper contraction and stretching of the cover and stabilize it in the open position. The cover, reinforced by cables, is pulled over middle fixed arms, positioned transversely in relation to middle columns; these are, unlike rotational pivoting arms for end columns, tightly fixed to middle columns so they can not rotate around them. The deficiency of this solution lies in its complexity, best seen in a significant number of elements necessary for proper stretching and contraction of the cover, thus resulting in complicated handling that requires special training for handlers, and a significant time necessary to adjust and switch from one to the other position.

Finally, the background technology also lists a solution in the domestic patent document No. RS20171264A1, which, similarly to the previous solution, consists of a row of columns with pivoting arms, over which a rectangular cover is pulled; the cover is supported by a central cable run through columns on the one side, and on the other, its longer sides have a sliding connection to side cables. Each side cable connects the ends of pivoting arms for which they are firmly fixed by rotational clips (which can be removed); the clips have rotational pins bearings at the end of pivoting arms. Pivoting arms are not single pieces, but consist of two parts, each rotationally connected to a column, so contraction of the cover can be done by clockwise and counter-clockwise rotation of pivoting arms, on either side of the column. This solution presumes the usage of rotational joints, i.e. rotational guide rails which provide efficient, simple, and quick stretching and stacking of the cover within the rotational system for orchard protection, and also its complete stretching and stabilization in the open position, i.e. proper and complete stacking without stacking resistance. However, such a solution—with guide rails constructed with clips—is deficient due to the fact that guide rails can get locked and tangled with the cover during the stretching, especially when the cover is a net, prone to tangling, which would disable the rotational mechanism and damage the cover. The second deficiency of this solution is the comparatively low load capacity of the tin clips. This particular deficiency comes to the fore during stronger winds, snow, or hail, since the load from the cover and side cables is translated to the guide rails.

Furthermore, the rotational clips found in this solution are made of non-standard parts, so the production cost is higher, and installation requires plenty of effort and time. Besides, the solution is extra fragile due to exposure to weather conditions, especially humidity and rainfall; this applies to both the fixed connection of cable and clip, but also the pin rotationally connected to the pivoting arm, which affects their reliability, especially concerning corrosion and freezing, so they would require lubrication more often and intensive maintenance, leading to higher operating costs.

Exposition of the Essence of the Invention

The abovementioned deficiencies of background technology are overcome by the present invention, related to the system with rotational guide rails for the protection of an orchard against weather conditions, which consists of a row of columns, the tops of which are rotationally connected to pivoting arms in the middle. A rectangular cover is draped over pivoting arms, either as a net or foil, and the central part is supported by the middle cable run through a transversal cylindrical opening fashioned at a pin placed on each column, which has a sliding connection to side cables via its longer side. Rotational guide rails are placed at the ends of pivoting arms, so that one end of the guide rail is firmly fixed to the cable, whereas the other end of the guide rail is rotationally connected to a pivoting arm's end. This approach enables translational motion of side cables during the rotation of pivoting arms, and so they come closer to each other, thus contracting the cover, which changes from rectangular into the shape of a parallelogram. When rotating the pivoting arms counter-clockwise, the side cables move away from each other in a translational motion, thus stretching the cover, which shifts from a parallelogram into a rectangle. Each side cable connects the ends of pivoting arms via rotational guide rails for which they are rotationally connected. The rotational guide rail consists of a screw that functions as a pin; its lower section is rotationally connected to the end of an arm, for which a side cable is firmly fixed, via standard screws and washers, and can be removed. A strong connection between the screw top, the cable, and the guide rail is placed inside a cylindrical casing, which prevents the contact between this end of the guide rail and the cover, so stacking of the cover is unobstructed during the contraction, i.e. it prevents the guide rails, consisting of pins with nuts and washers, from getting locked in the cover during the stretching. Besides, the height of the cylindrical casing surpasses the height of the screw, so the cover can't pass over it, which would result in the pin's nuts tangling into the net, thus disabling the rotational mechanism and damaging the cover, especially when the cover is a net. Namely, the cylindrical casing, which houses the guide rails, provides proper and unobstructed functionality of the rotational mechanism and its proper stacking and stretching. Besides, since the base of the guide rail consists of the rotational screw with nuts, rotationally connected to a pivoting arm, the guide rail design is robust and possesses high enough load capacity to endure the load from cables and translate it onto metal arms, even in extraordinary conditions, e.g. strong hail or wind blowing at the speeds of 90-100 km/h.

The present invention not only provides efficient, secure, and unobstructed cable movement when changing the cover from a rectangular shape into a parallelogram, and vice versa, but also lowers the production costs since it consists of standard parts. Additionally, the present invention provides protection for the connection between the screw and cable, which makes the adjustment easier, while simultaneously lowering the maintenance costs. This way, the standard elements lower the production cost on the one hand, while on the other, operational and maintenance costs are decreased since the guide rail is protected from environmental conditions by the casing.

In one example of a side cable motion, the cable is run through the screw and tightly fixed with nuts and washers. The screw and the cable thus connected are placed in a casing which is closed off with wide washers on both sides, placed on the screw, so the bottom of the screw is visible under the casing, in order to have a rotational bearing at the ends of the transversal pivoting arm, and rotate in the plane of arm's rotation.

In another example of the invention execution, the fixed connection between the cable and an end of the screw is protected by a cap, while the other end of the screw is placed inside the casing, firmly tied to each end of the pivoting arm, so it can rotate in the plane of the arm. Such an example of execution has an additional advantage—the screw is protected within the casing, thus enabling efficient rotation, better lubrication, and the protection of the joint against external conditions, which increases the reliability and durability of the connection.

The invention includes two other examples of execution where, unlike in the other examples of execution, the cable is tightened by nuts and run by the screw via additional washers, which further lowers the production costs, since there is no drilling of the screw involved.

BRIEF DESCRIPTION OF THE FIGURES

For the purposes of easier understanding of the invention, and the illustration of how it can be realized, the applicant submits the following figures:

FIG. 2—shows the pivoting arm in the shape of an arc, front view,

FIG. 3—shows the pivoting arm in the shape of an arc, a bird view,

A DETAILED DESCRIPTION OF THE INVENTION

Figure 1:
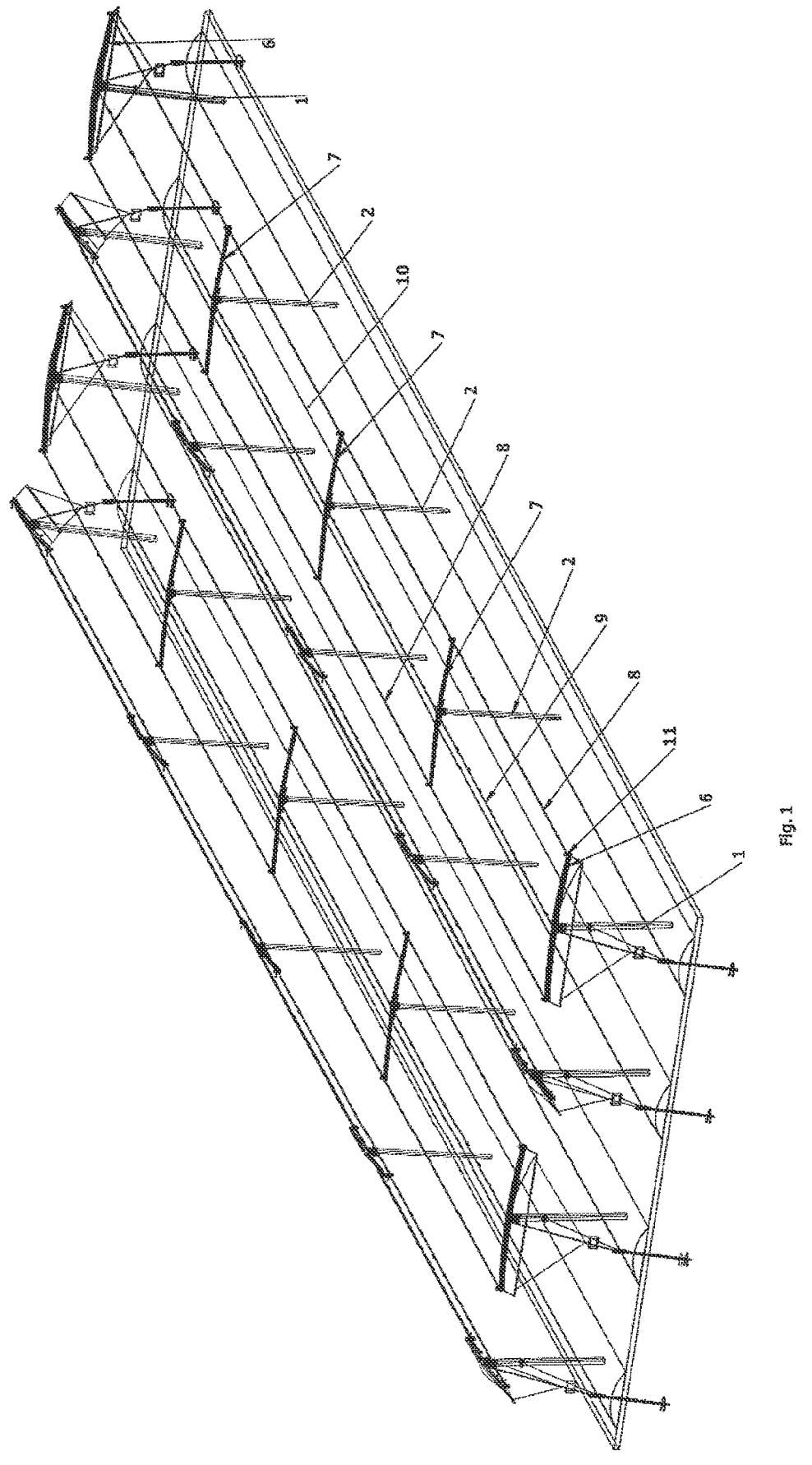
FIG. 1—shows the axonometric view of the system when disassembled.
Figures 4, 7:
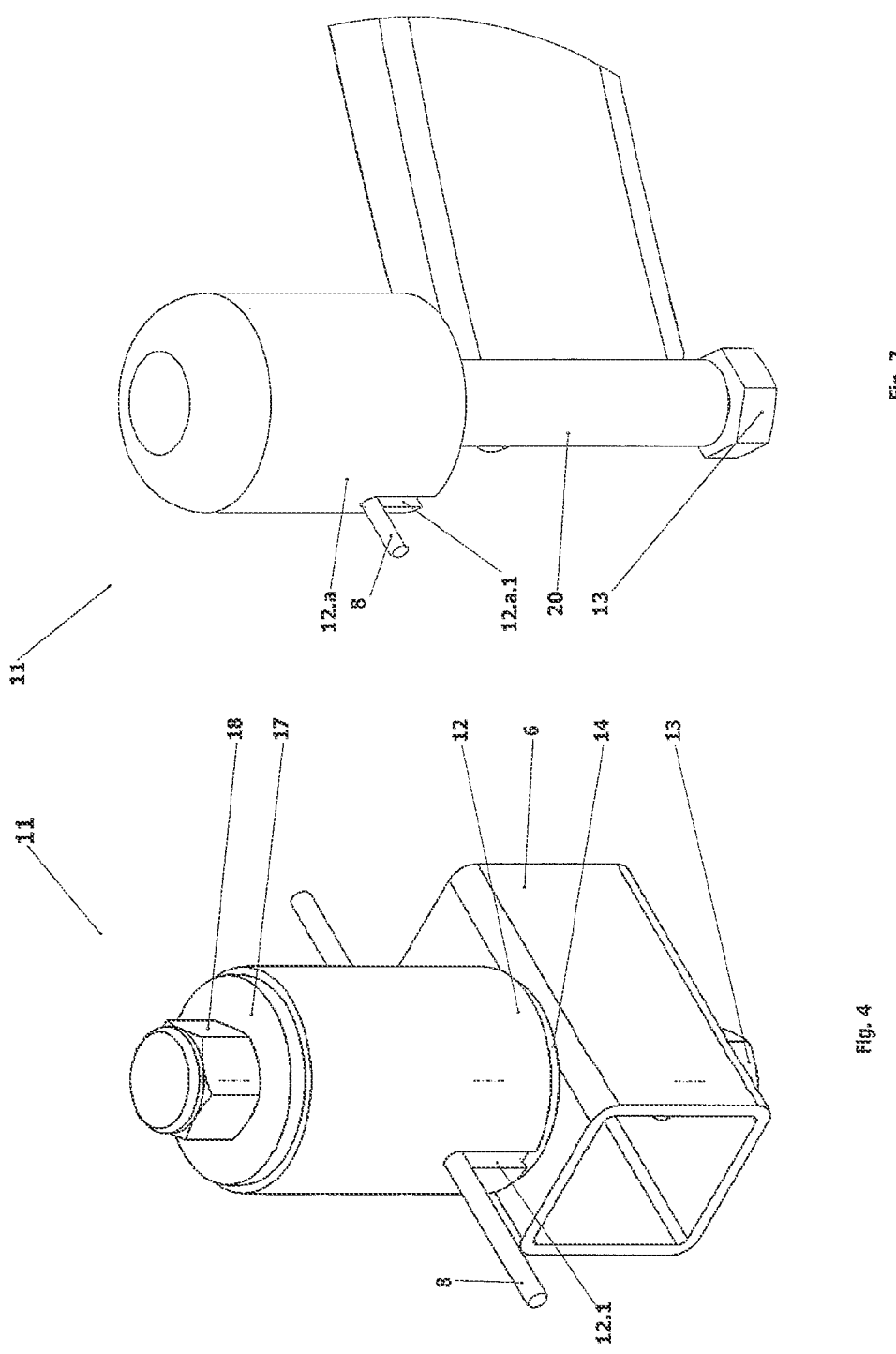
FIG. 4—shows the axonometric view of the rotational guide rail, concordant with the first example of execution, FIG. 5—shows the invention from FIG. 4, front view, FIG. 6—shows the cross-section E-E from the FIG. 5, FIG. 7—shows the axonometric view of the rotational guide rail, concordant with the second example of execution, FIG. 8—shows the cross-section A-A from the illustration 2, FIG. 9—shows the cross-section B-B from the illustration 3.
Figure 6:
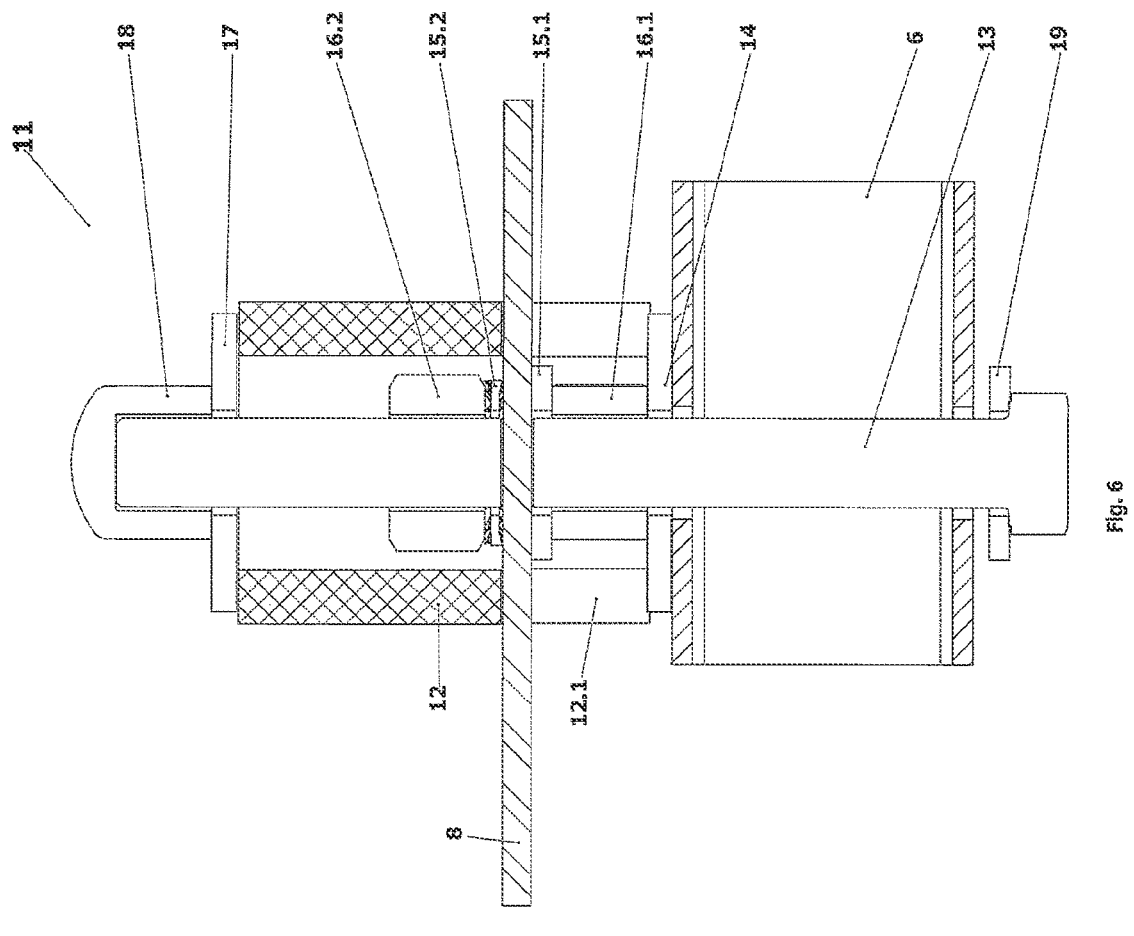
Figure 5:
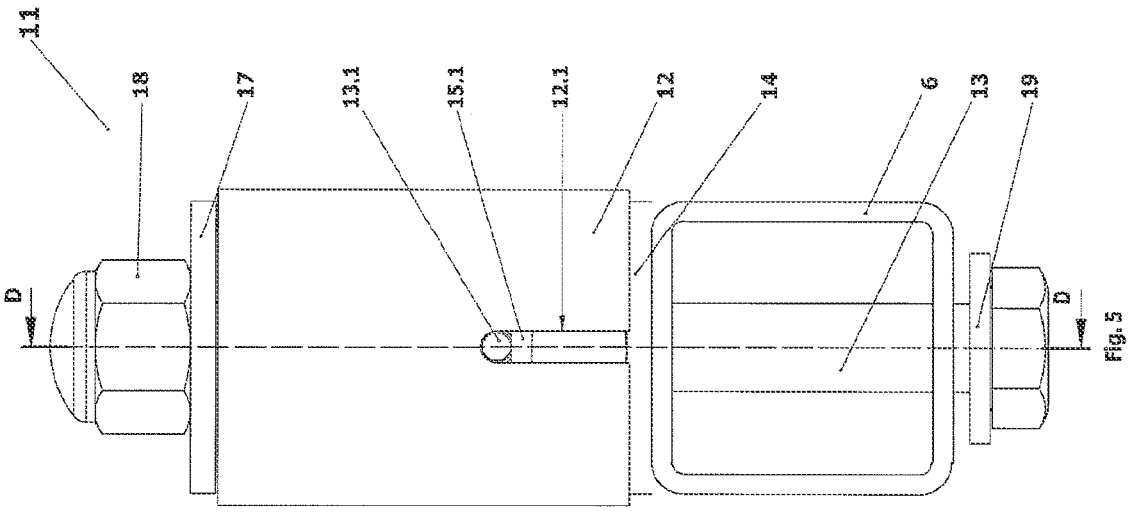
Figure 9:
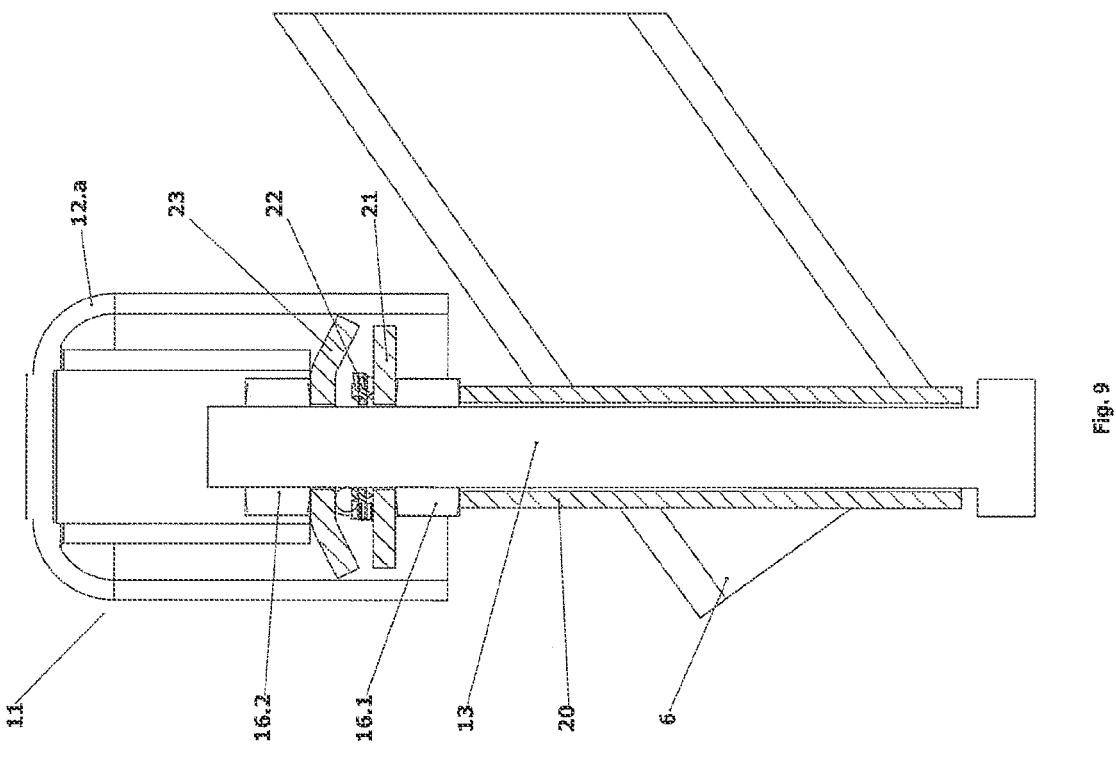
Figure 8:
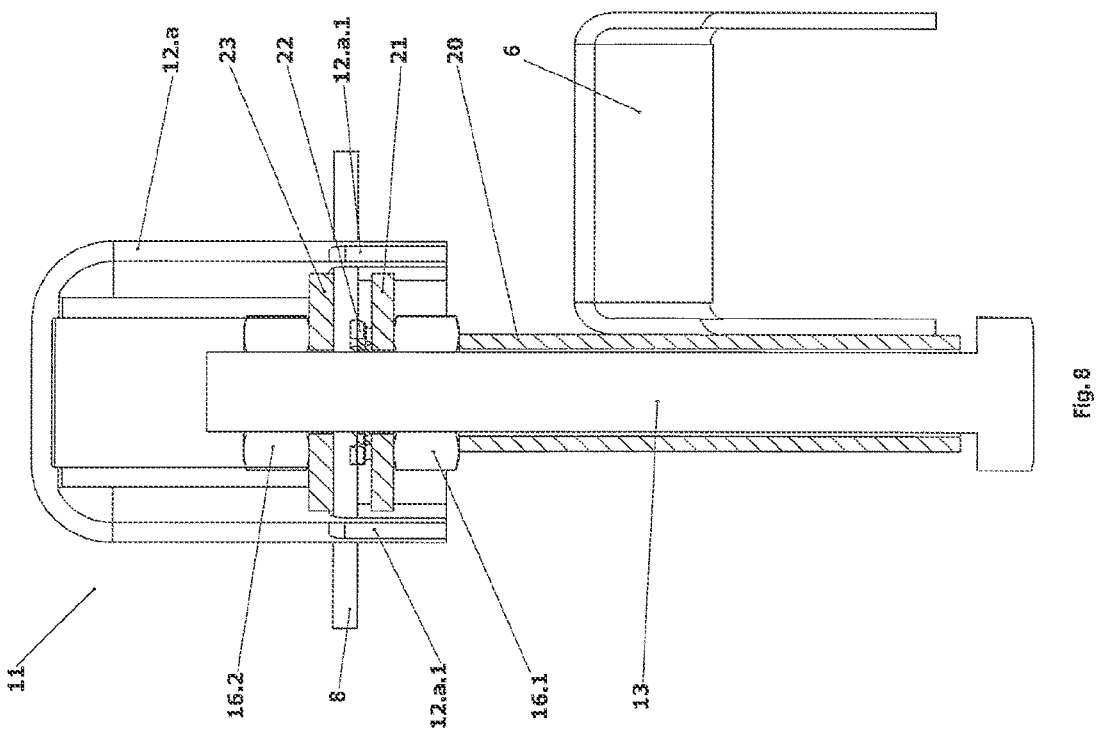

The present invention applies to the system with rotational guide rails for the protection of an orchard from weather conditions, according to the invention and FIGS. 1 to 9. Essentially, the system consists of bearing columns 1, placed at the beginning and the end of the row of trees, between which the auxiliary, i.e. middle columns 2 are placed, at a defined distance, on the designated parcel. The bearing and middle columns 1,2 are made in different cross-sectional forms, i.e. square, rectangular or circular, from metal or plastic. The supporting structure 3 is placed on columns 1,2 and the pin 5 is pressed and welded into the top of the structure, along with the cross-sectional cylindrical opening, on which a pivoting arm 6,7 is placed, rotating around pins 5, while the rotational guide rails 11 are placed at the ends of pivoting arms 6,7. The protective cover 10 is placed over the end pivoting arms 6 and middle pivoting arms 7, either as a net or a foil. The protective cover 10's base is rectangular, with longer sides placed over end cables 8, and with a sliding connection via plates or ties; the middle cable 9 runs through their middle section, parallel to them. Shorter sides of the protective cover 10 are placed throughout the whole length over the end pivoting arms 6 and connected via plates or ties. The middle cable 9 is placed so that it passes through a cross-sectional cylindrical opening on the columns' pin 5 and has a sliding connection to the protective cover 10 either through plates or ties. The end cables 8 are tightly connected to rotational guide rails 11, while the rotational guide rails 11 rotate at the ends of pivoting arms 6,7. The longitudinal profile of pivoting arms 6,7 can be straight, arcuated, or polyline.

According to one example of the invention execution, the rotational guide rails 11 (FIGS. 4, 5, 6) consist of the cylindrical casing 12, crafted in the shape of a pipe, and at the bottom of the casing 12 two parallel slits 12.1 are made, in the shape of a reversed letter "U". The screw 13 is placed in the middle of the casing 12, and it exits the casing 12 from both top and bottom. The lower end of screw 13 is rotationally placed at the end of pivoting arm 6, 7. A transversal cylindrical opening 13.1 is formed on the body of the screw 13, at the same height as the slit 12.1. On the bottom of the casing 12, a washer 14 is placed, and the washer 17 is on the top side, while between them and on the screw 13, two nuts 16.1 and 16.2 are screwed on; the lower nut 16.1 comes with a washer 15.1, while a fan disc washer 15.2 is placed on the bottom side of the upper nut 16.2. Washers 15.1, 15.2 can also be in reverse order, but it's important that one of them is a fan disc washer, since it increases the friction between contact surfaces. The screw 13 is fixed with a blind, i.e. self-locking nut 18, which provides a strong connection between the nut 18, casing 12, and washer 17. At the bottom of the screw 13, on its head, a washer 19 is placed, so the casing leans on the washer 14 through its bottom side, and the washer leans on the arm 6,7 through its bottom side. Down the axial direction between the washers 14, 19, the screw head 13, arms 6,7, and the casing 12, there is an axial end gap; the radial end gap is found between the openings in the arm 6,7, and the screw 13, so that the screw 13 can rotate within the openings of the arm 6,7, as its bearing and based on a loose fit in radial and axial directions.

The ends of pivoting arms 6, 7 include a vertical opening through which the screw 13 is run, so it can rotate in the same plane as the pivoting arms 6, 7. The washer 14 is placed on the bottom part of pivoting arms 6, 7, over which the casing 12 leans onto the upper side of the arm 6, 7, while the washer 19 is on the bottom side, over which the screw head 13 leans onto the bottom side of the arm 6, 7. The end cables 8 pass through the axis of pivoting arms 6, 7, and are run through the cylindrical openings 13.1, made on the screws 13, as well as the slits 12.1, made on the casing 12, so that the end cable 8 can freely glide in slits 12.1. During the installation, by tightening the upper nut 16.2 and the fan disc washer 15.2, a firm connection is established, i.e. the end cable 8 is firmly fixed between the fan disc washer 15.2 and the washer 15.1, placed on the bottom nut 16.1. Through such a strong connection of the cable 8 between the washers 15.1, 15.2, a strong connection is established between the cable 8 and the rotational guide rail 11, while the rotational guide rail 11 rotates at the ends of pivoting arms 6,7, during which the screws 13 act as an axle rotating with the casing 12, comprising a rotational joint.

In the second example of the invention execution, the rotational guide rails 11 (FIGS. 7, 8, 9) consist of the cylindrical cap 12.a, and two parallel slits 12.a.1 are made on the bottom side of the cap 12.a, in the shape of a reversed letter "U". Below the cap 12.a, the casing 20 is placed, which is fixed and welded onto the side of pivoting arms 6,7, and can not be removed. Through the cap 12.a and the casing 20, the screw 13 is placed, which extends to the middle of the cap 12.a's height on the upper side, so that between the screw head 13, bottom nut 16.1, and the casing 20 there is an axial end gap, while a radial end gap, i.e. a loose fit, is found between the body of the screw 13 and the casing 20, so that the screw 13 can rotate inside the casing 20. The cable 8 leans onto the side of the screw 13 and is firmly tied to the screw 13 in the rotational guide rail, by the upper nut 16.2 and the bottom nut 16.1, which are screwed onto the upper end of the screw, between which there is a coaxial connection to the washer 23, so it leans onto the upper side of the cable 8, and then onto the fan disc washer 22, leaning onto the bottom side of the cable 8, and the wide washer 21, placed between the bottom nut 16.1 and the fan disc washer 22. The fan disc washer 22 increases the friction between the contact surfaces. At the end, via the connection of the cable

8 and the screw 13, the closed cylindrical plastic cap 12.a is placed by pulling it over, so its inner parts firmly fit onto the external edges of the wide washer 21. At the end of the cap 12.a and on its internal side, a cylinder is placed and integrated with the bottom, the inner parts of which firmly fit onto the external edges of the upper nut 16.2. At the open end of the cap, on its cylindrical wall, two parallel slits 12.a.1 are made, through which the cable 8 can be run.

In this example of execution, the casing 20 is welded to the side of pivoting arms 6, 7, and can not be removed. The end cables 8 are run through the crafted slits 12.a.1 on the cap 12.a, and they pass by the screw 13, while being tightened between the fan disc washer 22 and the clamp washer 23, which is achieved by tightening of the upper nut 15.2, thus ensuring a strong connection between the cable 8 and the rotational guiding rail 11, while the rotational guiding rail 11 rotates at the ends of the pivoting arms 6, 7. In order for the cable 8 not to slip, it needs to be well-tightened by the nut 16.2.

Besides the two examples of execution mentioned above, another two examples of execution are possible, not shown in the illustrations. Namely, one example of execution shows the connection of the cable and the screw protected by the casing, like in the first example of execution, in which the cable does not pass through the screw, but beside it; the cable is tightened not only by the nuts and fan disc washer, but also the clamp washer, positioned coaxially relative to the nuts, so that the fan disc washer is between the cable and the upper nut, and the clamp washer is found between the upper nut and the cable, just like in the second example of execution. Additionally, an execution is possible with the connection of the cable and the screw protected by the cap, like in the second example of execution, so that the cable is tightened by the nuts and washers positioned coaxially to them, which make a contact with the cable, like in the first example of execution.

According to the invention, the performance of the guide rails 11 and pivoting arms 6, 7 is simple and serves the purpose of stretching and contracting the protective cover 10, whether as a net or a foil, within the system for protecting an orchard from weather conditions; it stems logically from the previous description of the invention and the illustrations. Namely, the pivoting arms 6, 7 push the outer ends of the cover 10 during their rotation, and the ends move towards the side cables 8 with which they have a sliding connection. In order to contract or stretch the protective cover 10, it is sufficient to rotate the first and the last pivoting arm 6 from the same row. Due to their fixed connection to cable 8, the middle pivoting arms 7 will also rotate, just like the end pivoting arms 6. Additionally, thanks to the rotational guide rails 11, for which the side cables 8 are tied firmly and which remain parallel to each other during the whole time of execution, the protective cover 10 can evenly and properly be contracted, with no resistance and no damages to the protective cover 10. Unobstructed contraction and stretching of the cover 10 are enabled by the cylindrical casing 12, i.e. the cylindrical cap 12.a which prevents the cover 10 passing over the guide rail 11 during contraction and stretching, i.e. prevents it from disabling the rotational mechanism functionality. In addition to that, the cylindrical casing 12 and the cylindrical cap 12.a protect the guide rail from external factors.

The rotational guide rails system for protection of an orchard from weather conditions is installed by placing the bearing columns 1 and auxiliary columns 2, after which a bearing construction 3 with pivoting arms 6, 7 is placed on top of the columns 1, 2. Galvanized cable 8 are run through the guide rails 11 and firmly fixed to them, while the end pivoting arms 6 are in a closed position. The cable 8 is run through a cylindrical opening 13.1 in the screw 13 and tightened between the washer 15.1 and the fan disc washer 15.2, obtained by tightening the top nut 16.2; conversely, in the second example of execution, the cable 8 passes by the screw 13 and is tightened between the fan disc washer 22 and the clamp washer 23, achieved by tightening the top nut 16.2. This establishes a strong connection of cable 8 in guide rails 11.

This procedure is repeated with the middle pivoting arms 7, up to the end pivoting arm 7 on the opposite end of the row, after which cable 8 is fully tightened and fixed by guide rails 11. The procedure is repeated for the other side of the pivoting arms 6, 7, and this approach ensures that all the arms face the direction determined by the cables 8.

The final step is pulling over the protective cover 10, in the form of a net or a foil, placed over the pivoting arms 6, 7, and the cables 8, 9; on each side, the protective cover falls over them, and the excess is wrapped around the pole for tensioning, tightened by the ties on both ends of the row, and the weight is placed, which keeps the protective cover 10 constantly tightened. A sliding connection is established between the tightened protective cover 10 and the cables 8, 9 by placing plastic plates or ties, which enables the sliding of the protective cover 10 across the cables 8, 9, and precludes the protective cover 10 from crumpling.

The invention claimed is:

1. System with guide rails for the protection of an orchard from weather conditions, which consists of a row of columns (1,2) with each column (1,2) stabilized in its base by one side, and on the top of each column (1,2) a pin (5) is placed onto which a pivoting arm (6,7) is rotationally positioned, while a middle cable (9) is run through a cross-sectional opening on the pin (5), and the ends of pivoting arms (6,7) are each connected via a single end cable (8), through a guide rail (11); over the pivoting arms (6,7) a rectangular cover (10) is placed, which has a sliding connection to the middle cable (9) by its middle section, and a sliding connection to end cables (8) through its longer sides, wherein a rotational guide rail (11) consists of a stud screw (13) connected to the end cable (8) on one end by tightening the cable (8) between two nuts (16.1, 16.2) screwed onto the same end of the screw (13), while the connection of one end of the screw (13) and side cable (8) is placed inside the cylindrical casing (12) or a cap (12.*a*), and the other end of the screw (13), with a fashioned head of the screw (13), is rotationally connected to the end of each pivoting arm (6,7), so that the rotational axis of the screw (13) is parallel to the rotational axis of the pivoting arm (6,7**).

2. The system according to the claim 1, wherein at one end of a stud screw (13) in the cross-sectional direction, an opening is made (13.1) through which an end cable (8) is run, and between nuts (16.1, 16.2), two washers (15.1, 15.2) are placed on the screw (13), between which a cable is tightened.

3. The system according to the claim 1, wherein between nuts (16.1, 16.2), and on a screw (13), a clamp washer (23), fan disc washer (22) and a washer (21) are placed in that order, so that a cable (8) is tightened between a clamp washer (23) and fan disc washer (22).

4. The system according to, claim 2, wherein on the end of a screw (13) a casing (12) is placed on the same axis, and over the casing (12) a washer (17) is placed, and then a blind nut (18) is screwed on so that the upper part of the casing (12) is closed and tightened to the screw (13), while at the other end of the casing (12) two parallel slits (12.1) are made, through which an end cable (8) is run, while at the other end of the screw (13), a washer (14) is placed, positioned between pivoting arms (6, 7) and the casing (12), and a washer (19) is placed between the pivoting arms (6, 7) and the head of the screw (13).

5. The system according to, claim 2, wherein over one end of the screw (13) a cylindrical cap (12.*a*) is placed in line with the axis, so that the inner parts of the cap (12.*a*) fit onto the outer edges of a washer (21), and at the open end of the cap (12.*a*), two parallel slits (12.*a*.1) are made, through which an end cable (8**) is run.

6. The system according to the claim 5, wherein at the bottom of a cap (12.*a*), on its inner side, a cylinder is made together with the bottom, and its inner edges fit onto the outer edges of an upper nut (16.2**).

7. The system according to claim 5, wherein the cap (12.*a***) is made of plastic.

8. The system according to the claim 4, wherein the other end of a screw (13) is rotationally connected to the end of a pivoting arm (6, 7) via two vertical openings down the same axis, made at the end of the pivoting arm (6, 7).

9. The system according to the claim 5 wherein the other end of a screw (13) is rotationally connected to the end of a pivoting arm (6, 7) via a cylindrical casing (20) tied to the end of the pivoting arm (6, 7), and the screw (13) is run through the casing (20).

\* \* \* \* \*